US006578105B2

(12) United States Patent
Finn et al.

(10) Patent No.: US 6,578,105 B2
(45) Date of Patent: Jun. 10, 2003

(54) METHOD OF VALIDATING DATA IN CIRCULAR BUFFERS

(75) Inventors: Dawn Finn, Kanata (CA); George Jeffrey, Nepean (CA)

(73) Assignee: Zarlink Semiconductor Inc., Ottawa (CA)

( * ) Notice: Subject to any disclaimer, the term of this patent is extended or adjusted under 35 U.S.C. 154(b) by 0 days.

(21) Appl. No.: 09/950,673

(22) Filed: Sep. 13, 2001

(65) Prior Publication Data

US 2002/0035663 A1 Mar. 21, 2002

Related U.S. Application Data

(60) Provisional application No. 60/236,160, filed on Sep. 29, 2000.

(30) Foreign Application Priority Data

Sep. 15, 2000 (GB) .............................................. 0022802

(51) Int. Cl.[7] .............................................. G06F 12/00
(52) U.S. Cl. .......................... 711/110; 710/56; 710/57; 714/719
(58) Field of Search ................................ 711/110, 100, 711/207; 710/57, 55, 56; 714/719, 799, 718

(56) References Cited

U.S. PATENT DOCUMENTS

| | | | | |
|---|---|---|---|---|
| 4,692,893 A | | 9/1987 | Casper ........................ 710/55 |
| 4,821,171 A | | 4/1989 | Calamari ..................... 711/207 |
| 4,916,658 A | * | 4/1990 | Lee et al. .................... 711/100 |
| 4,942,553 A | * | 7/1990 | Dalrymple et al. ........... 710/57 |
| 5,438,575 A | * | 8/1995 | Bertrand ..................... 714/799 |
| 5,696,768 A | | 12/1997 | Harriman et al. ........... 714/718 |
| 5,884,101 A | * | 3/1999 | Wu .............................. 710/57 |
| 6,337,893 B1 | * | 1/2002 | Pontius ...................... 377/108 |
| 6,408,409 B1 | * | 6/2002 | Williams et al. ............ 714/719 |

FOREIGN PATENT DOCUMENTS

WO           94/11800        5/1994

OTHER PUBLICATIONS

MT90500, Multi-Channel ATM AAL1 SAR.

* cited by examiner

Primary Examiner—Do Hyun Yoo
Assistant Examiner—Nasser Moazzami
(74) Attorney, Agent, or Firm—Marks & Clerk

(57) ABSTRACT

Data is written into a circular buffer at an address pointed to by a write pointer. A number is written into the address with the data. Each time the circular buffer is traversed by the write pointer this number increments modulo a predetermined number. This number makes the circular buffer appear longer than it really is and can be used to identify underruns. The buffer has application in a segmentation and reassembly device for ATM constant bit rate services.

13 Claims, 2 Drawing Sheets

| MF | Res | Turn | CAS | TDM Byte |
|----|-----|------|------|----------|
| 0 | 0 | 0 1 | X X X X | X X X X X X X X |
| 0 | 0 | 0 1 | X X X X | X X X X X X X X |
| 0 | 0 | 0 1 | X X X X | X X X X X X X X |
| 0 | 0 | 0 1 | X X X X | X X X X X X X X |
| 0 | 0 | 0 1 | X X X X | X X X X X X X X |
| 0 | 0 | 0 1 | X X X X | X X X X X X X X |
| 0 | 0 | 0 1 | X X X X | X X X X X X X X |
| 0 | 0 | 0 1 | X X X X | X X X X X X X X |
| 0 | 0 | 0 1 | X X X X | X X X X X X X X |
| 0 | 0 | 0 1 | X X X X | X X X X X X X X |
| 0 | 0 | 0 1 | X X X X | X X X X X X X X |
| 0 | 0 | 0 1 | X X X X | X X X X X X X X |
| 1 | 0 | 0 1 | A B C D | 0 0 1 0 1 0 1 0 |
| 0 | 0 | 0 0 | X X X X | X X X X X X X X |
| 0 | 0 | 0 0 | X X X X | X X X X X X X X |
| 0 | 0 | 0 0 | X X X X | X X X X X X X X |
| 0 | 0 | 0 0 | X X X X | X X X X X X X X |
| 0 | 0 | 0 0 | X X X X | X X X X X X X X |
| 0 | 0 | 0 0 | X X X X | X X X X X X X X |
| 0 | 0 | 0 0 | X X X X | X X X X X X X X |
| 0 | 0 | 0 0 | X X X X | X X X X X X X X |

METHOD OF VALIDATING DATA IN CIRCULAR BUFFERS

CROSS REFERENCE TO RELATED APPLICATIONS

This application claims the benefit under 35 USC 119(e) from prior U.S. provisional application No. 60/236,160 filed Sep. 29, 2000.

FIELD OF THE INVENTION

This invention relates to digital communications, and more particularly to a method of managing a circular buffer.

BACKGROUND OF THE INVENTION

Circular buffers are used in many applications where, for example, data may arrive at a varying rate and need to be read out at a constant rate. A particular application of circular buffers is in ATM circuit emulation services, where cells carrying constant bit rate data arrive at varying times determined by CDV (Cell Delay Variation), and the data contained in the cells has to be read out onto a TDM bus at a constant rate.

In a circular buffer, it is of course possible for the incoming data to get too far ahead of the reading of the outgoing data for the size of the buffer, in which case unread data will be overwritten by new data and an "overrun" will occur. Similarly, if the new data arrives at an insufficient rate to replenish the data in the buffer, the read-pointer will re-read old data, and in this case an "underrun" occurs. It is important to be able to identify buffer underruns and overruns.

Mitel Corporation makes a SAR (Segmentation and Reassembly) device sold under product number MT90500 for creating TDM data streams from incoming ATM cells, which are written into circular buffers (one for each TDM channel). A single-bit flag in the data circular buffer is used to indicate whether the data in a memory location has been read. This bit is cleared upon data writes and is set (written to '1') after the data is read, to indicate that the data has been read.

Additionally, the MT90500 and other devices overwrite the circular buffer data itself with FFh (or some other pre-specified pattern) to indicate that the data has been read.

U.S. Pat. No. 5,584,038 discloses a method of using wrap bits in a circular buffer to indicate whether a queue of the circular buffer has been traversed.

U.S. Pat. No. 5,978,868 discloses a system for generating buffer status flags by comparing read and write pointers and determining direction of progression of a read-pointer with respect to a write pointer.

An object of the present invention is to permit the identification of read underruns without the need for semaphore flags.

SUMMARY OF THE INVENTION

According to the present invention there is provided a method of managing a circular buffer, comprising writing data into said circular buffer at an address pointed to by a write pointer, and writing into said address a first number that increments modulo a predetermined number each time said circular buffer is traversed by the write pointer.

The number is preferably in the form of a most significant bits (MSB) extension of the write pointer. It typically consists of two extra bits, which permit four distinct rotations 0, 1, 2, 3, 0, 1, 2, 3, 0, 1, 2, etc. These two extra bits are written into the circular buffer alongside the circular buffer data. The two extra bits are called "turns". The number could also consist of a single bit.

A similar number is incremented each time the read pointer traverses the circular buffer. When data is read from the circular buffer, the number associated with the read pointer is compared to the number associated with the data in the buffer. This enables the validity of the data to be checked (i.e., to determine whether or not an underrun has occurred). Typically, the number associated with the read pointer is also in the form of an extension to the read pointer, typically two extra most significant bits.

This technique permits the system to distinguish between a short-duration underrun and a long-duration underrun or between an overrun and an underrun by the magnitude of the difference in the "turns" bits associated with the data in the buffer address being read and the read pointer.

In another aspect the invention provides a circular buffer comprising a plurality of address locations for storing data; a write pointer for pointing to an address in said circular buffer where incoming data is to be written; a read pointer for pointing to an address in said circular buffer from which data is to be read out; and each of said buffer addresses including a register portion storing a first number associated with said write pointer, said first number incrementing modulo a predetermined number each time said circular buffer is traversed by the write pointer.

The invention will now be described in more detail, by way of example only, with reference to the accompanying drawings, in which.

The invention may be applied to a device, such as the Mitel MT90528 device referred to above. In such a device, the SDT RX_SAR sub-module is responsible for extracting data from incoming ATM cells and transferring that data to (one or many) Reassembly Circular Buffer(s) in external memory (depending on the number of TDM channels). The data is then read from the circular buffer(s) by the TDM module.

The SDT RX_SAR is responsible for writing to the circular buffer(s) at an appropriate location, based on the current values of the SDT RX_SAR's write pointer and the TDM module's read pointer.

Figure 1:
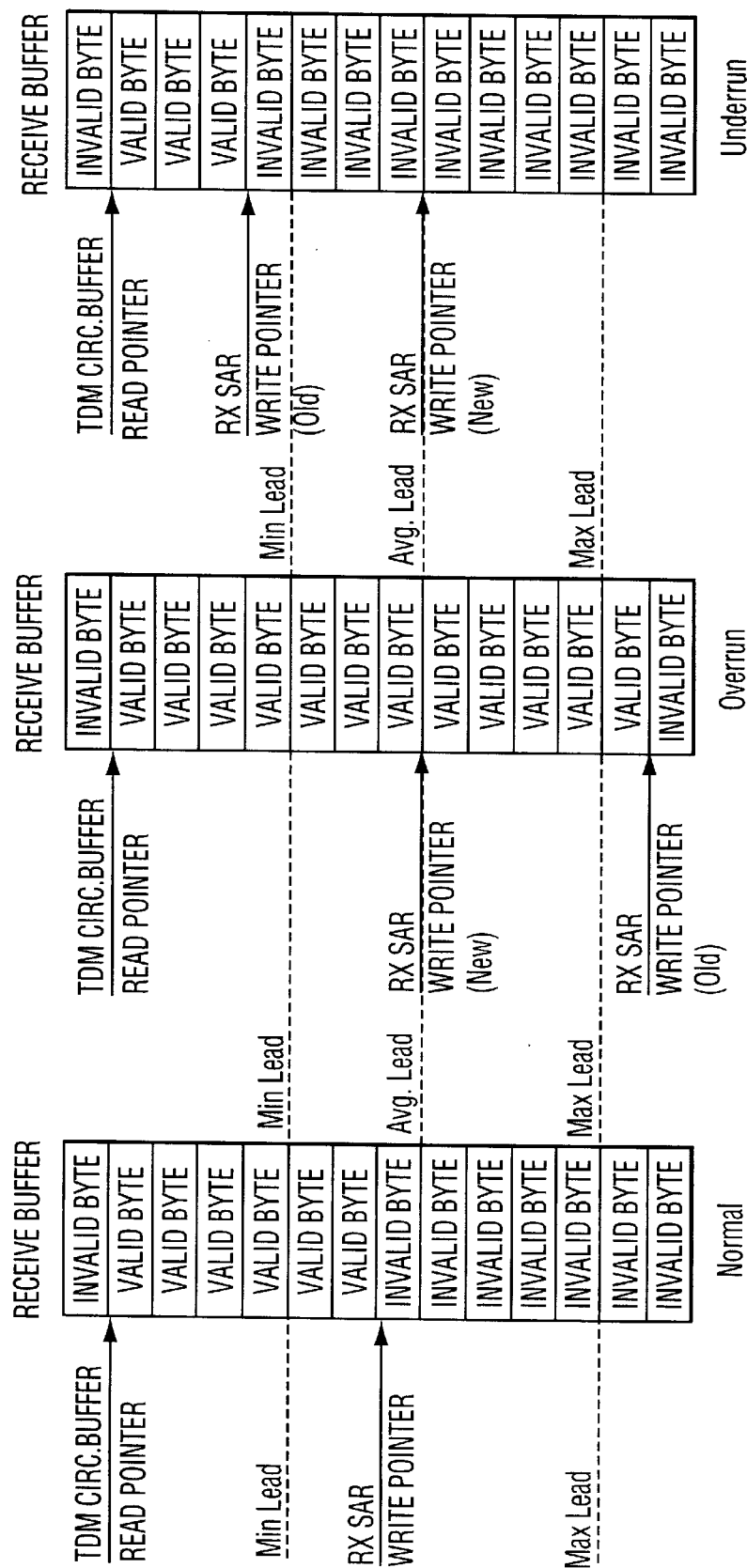
FIG. 1 shows underrun and overrun situations in a prior art RX_SAR.

When a new cell is received, the hardware checks for the location of the RX_SAR write pointer, which indicates where a new cell should be written within the associated receive circular buffers. In FIG. 1, the VALID bytes indicate bytes that have been written into the circular buffer and have yet to be read to the TDM output process. INVALID bytes represent those that have already been read, or in the case of start-up never been written. If the pointer falls within the window defined by the Min. Lead and Max. Lead parameters, the new data is written immediately following the old data. If the RX_SAR write pointer falls after the maximum lead pointer, an overrun condition is detected, and the new data is written starting at the position of the average lead pointer. In this case, some addresses containing unread data will be overwritten (i.e. some data will be lost). If the write pointer falls behind the minimum lead pointer, an underrun condition is detected, and again the write pointer is moved to the location of the average lead pointer. In this case, some already read bytes will be skipped and left unwritten.

In this prior art device, an external memory for the TDM output process has its own TDM read underrun error indication. The ninth bit of the external memory byte is used to indicate whether each TDM byte has been previously transferred to the TDM bus. When the TDM output process reads a byte which has already been transferred (i.e., the ninth bit is set), an underrun condition is flagged, if enabled by that TDM channel's entry in an associated control structure.

Depending on the value of a write-back disable bit for each TDM channel, bytes read out to the TDM bus will either be replaced by silence (FFh) or left unchanged. This has the effect that in the event of an underrun, either silence will be read out of the skipped area, or the old data in the skipped area will be repeated on the TDM bus.

Figures 2, 3:
FIG. 2 shows an SDT reassembly circular buffer for an RX_SAR in accordance with the principles of the invention.
FIG. 3 shows schematically a comparator for comparing the write and read turn bits.

In accordance with the principles of the invention, as shown in FIG. 2, each time that the SDT RX_SAR writes data to the circular buffer, it also writes a two-bit value (called the "turns") to the Reassembly Circular Buffer alongside the data. This two-bit value is generated by extending the SDT RX_SAR's write pointer by two most significant digits. These turn bits effectively make the circular buffer four times as long as it is physically. The turn bits are incremented each time the circular buffer is traversed, when the SDT RX_SAR again begins writing to the first entry of the circular buffer. Every four rotations through the circular buffer, the turns bits return to '00'.

Each time that the TDM module reads from the circular buffer(s), it reads not only the data, but also the turns bits that are stored alongside the data. The TDM module compares the turns bits to a two-bit value which is generated internal to the TDM module by extending the TDM module's read pointer by two most-significant bits.

The TDM module includes a comparator shown in FIG. 3 to perform the following calculation to determine whether underruns have occurred:

if(TDM read pointer bits=turns)
  no underrun
else if(TDM read pointer bits=turns+1)
  "simple" underrun
else//if((TDM read pointer bits=turns+2)|(TDM read pointer bits=turns+3))
  "permanent" underrun Alternative versions of the comparator algorithm could be used. If a one-bit turn field was used, errors could be detected, but different degrees or types of errors could not be distinguished. Using two bits, simple and permanent underruns could be distinguished (as shown above or underruns and overruns can be classified.

During an underrun condition, the TDM module will either replay the data currently in the buffer (the "old" data which was not automatically overwritten on reads, as in the MT90500) or will play out a user-configurable data byte. The determination of what type of data to play out is made via a user-configurable register bit.

The Reassembly Circular Buffers store the reassembled TDM data streams. These Circular Buffers are located in external memory and are typically 16-bits wide and each entry is composed of the following:

One bit to indicate the multiframe (bit[15]).
One bit is reserved (bit[14])
Two bits are for turn (bits[13:12]).
Four bits for CAS (bits[11:8]).
Eight bits for TDM data (bits[7:0]).

FIG. 2 shows a specific example of the structure of the circular buffers in more detail. The field headings have the following meanings:

MF—multi-frame indicator; this bit is used only when a VC is carrying CAS data (if a Virtual Channel isn't carrying CAS (Channel Associated Signaling), the MF bits are always zero); the MF bit is set in the buffer for every channel of a VC, each time that the SDT RX_SAR determines the location of the start of the next multi-frame Res—reserved field; this field always contain a zero Turn—this field contains a copy of the two most significant bits of the SDT RX_SAR write pointer for the VC. These bits represent the "turn" of the circular buffer (effectively making the buffer appear to be 4 times as long as it is physically). These bits are used by the TDM module for underrun detection.

CAS—If CAS data is being processed, this field contains the nibble of data which was last received by this channel (i.e., in the previous multi-frame). CAS data is repeated for an entire multi-frame (i.e., 24 consecutive entries in DSI case; 16 consecutive entries in EI case).

TDM Byte—This field contains the TDM data bytes which are extracted from received cells. If dummy cells have been inserted, this field contains the value of the dummy data programmed by the user.

Underrun Detection in SDT (Structured Data Transfer) Mode

In a particular embodiment in accordance with the principles of the invention, the SDT TDM reassembly process compares the two most significant bits of the read pointer with the two turn bits in the external circular buffer:

1—Comparison: 2 MSB of the read pointer=tdm_ext_data[13:12]. If the comparison is true, there is no underrun and the TDM data is read out normally onto the TDM bus.

2—If the previous comparison was false, a second comparison is done. Second comparison: 2 MSB of the read pointer=tdm_ext_data[13:12]+1. If this one is true, the REPLAY_NSILENCE bit is checked. If it is set, the reassembly process keeps reading the circular buffer. If it is not set, silence bytes are written to a TDM Dual Port RAM connected to the TDM bus. If this comparison is true, a "simple" underrun has occurred.

3—If the two previous comparisons were false, then a third comparison is done. Third comparison: 2 MSB of the read pointer=tdm_ext_data[13:12]+2 or 2 MSB of the read pointer=tdm_ext_data[13:12]+3. If this one is true, the REPLAY_NSILENCE bit is checked. If it is set, the reassembly process keeps reading the circular buffer and playing out the data onto the TDM bus. If it is not set, silence bytes are played out onto the TDM bus. If either of the comparisons in this step are true, a "permanent" underrun is declared.

It will be understood by one skilled in the art that many variations are possible. In particular, it is possible to vary the number of turn bits used. The invention can also be used to detect overruns as well as underruns, and the user can be given the option of whether or not to distinguish between short-duration and long-duration underruns.

The described invention thus permits the identification of read underruns in a data circular buffer without requiring that semaphore flags or buffer data be written back to the circular buffer. The invention is specifically applicable to both ATM and Voice Over Internet (VoIP) circular buffers.

This invention may be used in any application in which circular buffers are used for data storage and/or where slips (i.e., underruns or overruns) between two different data rates can occur.

What is claimed is:

1. A method of managing a circular buffer comprising:
   writing data into said circular buffer at an address pointed to by a write pointer;
   writing into said address a first number that increments modulo a predetermined number greater than one each time said circular buffer is traversed by the write pointer;
   associating a second with a read pointer for said circular buffer, said second number incrementing modulo said predetermined value greater than one each time said circular buffer is traversed by the read pointer;
   comparing said second number with said first number when said data is read out of said buffer; and
   declaring a "no underrun" condition when said first and second numbers are the same, a first type of underrun condition when the difference between the first and second numbers is equal to one and a second type of underrun condition when the difference between said first arid second numbers is greater than one.

2. A method as claimed in claim 1, wherein said first and second numbers appear as extensions of the respective write and read pointers.

3. A method as claimed in claim 2, wherein aid first and second numbers appear a most significant bit extension of said write and read pointers.

4. A method as claimed in claim 2, wherein said first and second numbers consist of two extra bits.

5. A method as claimed in claim 4, wherein said two extra bits are the most significant bits.

6. A method as claimed in claim 1, wherein said first type of underrun condition is a "simple" underrun condition and said second type of underrun condition is a "permanent" underrun condition.

7. A method as claimed in claim 1, wherein said data is time sensitive traffic carried over an ATM network.

8. A method as claimed claim 1, wherein said data is time voice traffic carried using Internet Protocol.

9. A circular buffer arrangement comprising:
   a plurality of address locations for storing data;
   a write pointer for pointing to an address in said circular buffer where incoming data is to be written, said write pointer being associated with a first number that increments modulo a predetermined number greater than one each time said circular buffer is traversed by said write pointer;
   a read pointer for pointing to an address in said circular buffer from where data is to be read out, said read pointer being associated with a second number that increments modulo said predetermined number greater than one each time said circular buffer is traversed by said read pointer;
   cach of said buffers address locations including a register portion storing said first number; and
   a comparator for comparing said second number with said first number stored in an address location during a read operation and declaring a "no underrun" condition when said first and second numbers are the same, a first type of underrun condition when the difference between the first and second numbers is equal to one, and a second type of underrun condition when the difference between said first and second numbers is greater than one.

10. A circular buffer arrangement as claimed in claim 9, wherein said first number is an extension of each said address location storing said data.

11. A circular buffer arrangement as claimed claim 9, which forms part of an ATM RX_SAR device for time sensitive traffic.

12. A circular buffer arrangement as claimed claim 9, which forms part of an Voice over Internet Protocol conversion device.

13. A circular buffer arrangement as claimed in claim 9, wherein said first type of underrun condition is a "simple" underrun condition and said second type of underrun condition is a permanent underrun condition.

* * * * *